United States Patent [19]
Lang et al.

[11] 3,724,358
[45] Apr. 3, 1973

[54] AIRING DEVICE FOR MOTOR VEHICLES

[75] Inventors: Willi Lang, Ingolstadt; Manfred Sprenger, Lenting, both of Germany

[73] Assignee: Audi NSU Auto Union Aktiengesellschaft, Ingolstadt, Germany

[22] Filed: May 19, 1970

[21] Appl. No.: 38,712

[52] U.S. Cl. ................................................. 98/2.18
[51] Int. Cl. ............................................... B60h 1/24
[58] Field of Search ................... 98/2.00, 2.11, 2.18

[56] References Cited

UNITED STATES PATENTS

| | | |
|---|---|---|
| 3,391,628 | 7/1968 | Ziegenfelder ........................ 98/2.18 |
| 3,274,915 | 9/1966 | Ziegenfelder ........................ 98/2.18 |
| 3,286,617 | 11/1966 | Shirk .................................... 98/2.18 |
| 3,059,562 | 10/1962 | Sturtevant ............................ 98/2.18 |
| 3,406,622 | 10/1968 | Goetz .................................... 98/2.18 |
| 3,554,110 | 1/1971 | Goetz .................................... 98/2 |

*Primary Examiner*—Meyer Perlin
*Attorney*—Richards & Geier

[57] ABSTRACT

An airing device is provided for motor vehicles having a body suitable for air flow and a flap-like rear door. The invention is particularly characterized in that the inner part of this door is provided with slits preferably upon all four frame walls which limit the door surface and which form the frame beams. Frame beams extending parallel to the direction of the drive have walls with slits which open into a space connected with the door joint between the door frame and the door post.

7 Claims, 3 Drawing Figures

AIRING DEVICE FOR MOTOR VEHICLES

This invention relates to an airing device for motor vehicles having a body suitable for air flow and a flap-like rear door.

In prior art airing devices are known for motor vehicles having a body suitable for air flow wherein a door space provided in the outer covering of the body, has a free passage for the inflow of air and is located in the overpressure area of air flowing around a moving vehicle. These devices also have an inwardly extending air receiving space separated from the interior of the vehicle by a wall having connecting openings.

Flap-like rear doors are also known which are used for the placing of luggage and, possibly, for the entry of passengers.

An object of the present invention is to provide effective airing for a motor vehicle of this type without the use of additional parts.

Other objects of the present invention will become apparent in the course of the following specification.

In the accomplishment of the objectives of the present invention it was found advisable to provide the inner part of these doors with slits preferably upon all four frame walls which limit the door surface and which form the frame beams, the frame beams extending parallel to the direction of the drive having walls with slits opening into a space connected with the door joint between the door frame and the door post. This provides the particular advantage that air is sucked off from all sides of the door surface and that it is practically impossible for the surface to be covered with moisture. Since air is sucked off into the frame beams of the door, no special parts are required for the aeration.

The manufacture of the airing device can be simplified by the provision of a flange limiting the slits and extending inwardly into the frame beam. The flange balances the weakening of the frame beam caused by the slit.

Preferably, the outlet slits are provided by the downwardly pressed fixing flange of the inner part of the door.

The inlet slits are shifted in relation to the outlet slits in the inner part of the door to avoid penetration of water into the spaces for the passengers.

According to a further feature of the present invention the slit between the door frame and the door post extends downwardly into a channel for the outflow of water. Due to this arrangement water is held in a banked-up space before it can flow through the slit between the inner part of the door and the door post into the outflow channel. This makes more difficult the penetration of water into the inner door beam.

The outer part of the door with the flange can extend over the inner part and a step parallel to the flange can be provided in the door post opposite the projecting flange.

Finally, the door packing can be provided upon a raised edge of the water outflow channel facing the interior of the car body.

The invention will appear more clearly from the following detailed description when taken in connection with the accompanying drawings showing by way of example only, a preferred embodiment of the inventive idea.

IN THE DRAWINGS

Figure 1:
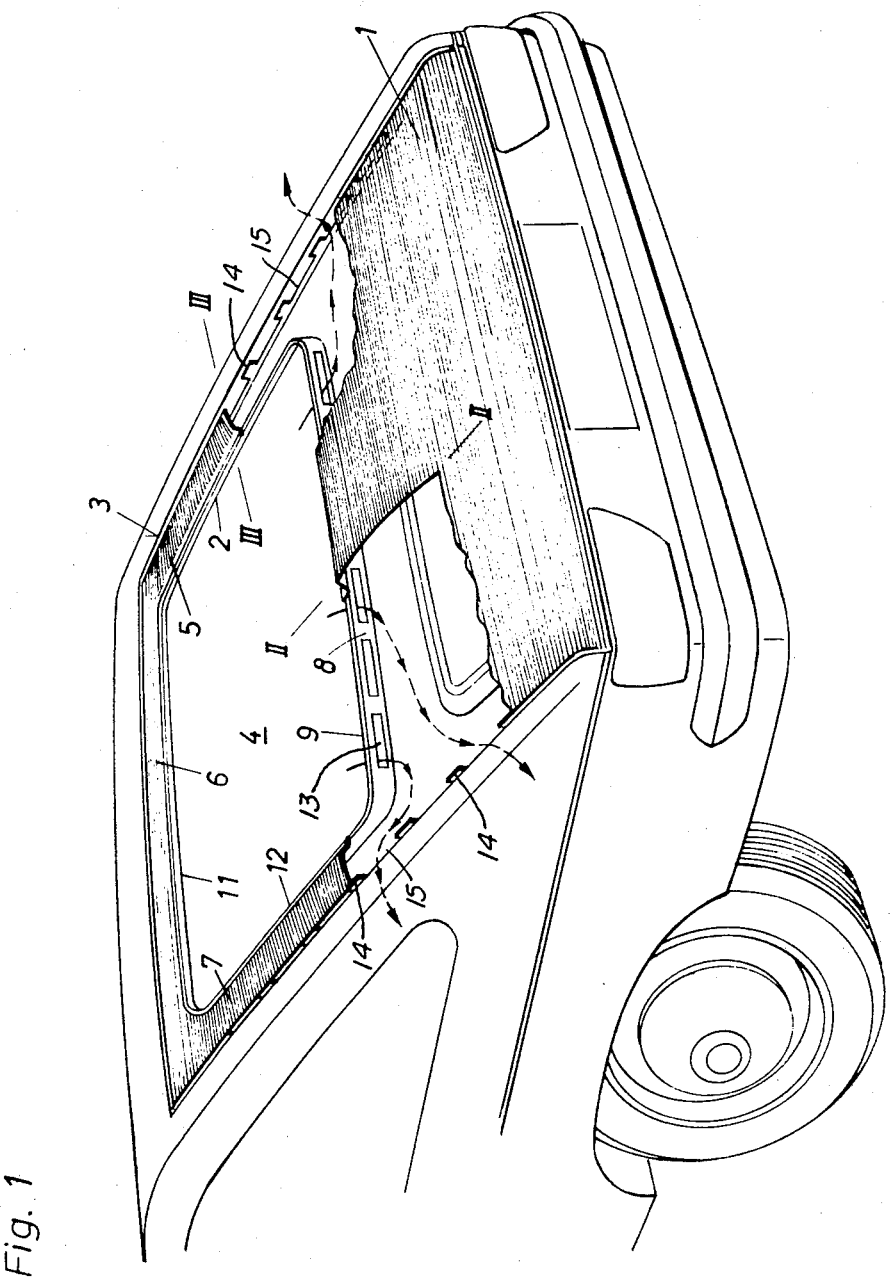
FIG. 1 is a perspective view of the rear portion of a motor car having a flap-like door, some parts being shown in section.

The flap-like rear door 1 of a motor car consists of an inner part 2 and an outer part 3. The inner part 2 of the door 1 has frame beams 5, 6, 7 and 8 which enclose the door surface 4 and which form frame walls 9, 10, 11 and 12 provided with slits 13. Frame beams 5 and 7 extending parallel to the direction of the car have walls 14 with outflow slits 15 which open into a space 17 between the door frame and the door post 18 connected with the door joint 16. Slits 13 are limited by a flange 19 extending inwardly to the frame beam 8. The frame beam forms a channel for air. The outflow slits 15 are formed by a downwardly pressed supporting flange 20. The inlet slits 13 are shifted in relation to the outflow slits 15. The space 17 between the door frame and the door post 18 opens downwardly into a channel 21 for the outflow of water. The outer door part 3 extends with its flange 22 over the inner door part 2. The door post 18 has a step portion 23 parallel to the projecting flange 22. The door packing 24 is located upon an upwardly extending wall 25 of the channel 21 which faces the interior of the car body.

Figure 2:
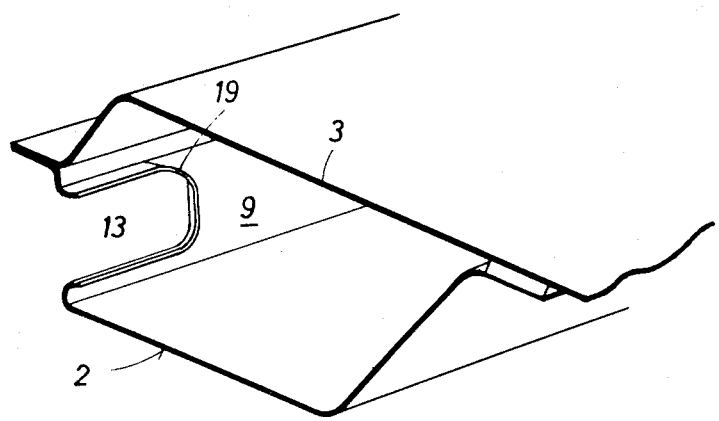
FIG. 2 is a section through a transverse beam along the line II—II of FIG. 1.
Figure 3:
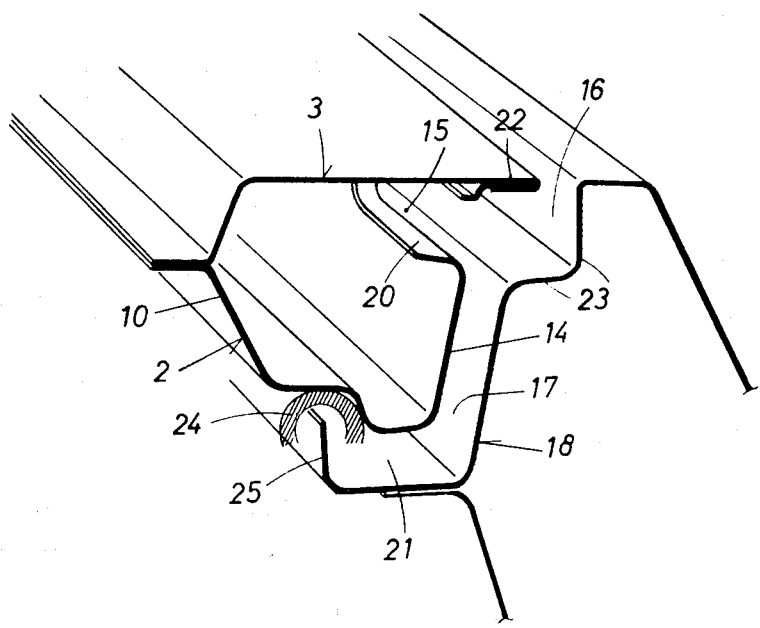
FIG. 3 is a section through a longitudinal beam of the door and the adjacent door post along the line III—III of FIG. 1.

As shown in FIG. 1, the frame beams 5–8 constitute an inner rectangular structure spaced from the outer parts. Consequently, the hollow space shown in FIG. 2, which is a section through the beam 8, is in communication with the hollow space shown in FIG. 3, which is a section through the beam 5. Thus air flowing into the rectangular space through the inflow slits 13 will readily leave it through the outflow slits 15, as indicated by arrows in FIG. 1.

Slits 15 are located outwardly at the door frame; thus they connect the interior of the door frame with the outer air and the door joint 16. The purpose of the slits 13 is to suck air from the interior of the car to the door plate 4 along the interior of the door or the door frame. Thus when the rear door 1 is raised, the slits 13 and 15 as well as the walls 14 are also raised. Due to the novel arrangement of the slits 13 they suck air away from the door plate 4 and guide to it new air which is not yet filled with moisture. Thus they prevent the door plate from being covered with moisture and provide a good view in all types of weather if the door plate 4 is transparent.

Since slits 13 can be located at all four sides of the plate 4, they suck in air currents of large cross section along the door frame at the plate 4. The air currents have also a substantially great speed since they are sucked out of the door frame by many slits 15 along long door joints 16 over which outer air flows with great speed. Due to the inclination of the flap door the joints 16 are located in an underpressure area which also improves the suction of air through slits 13 and 15.

Thus the construction of the present invention prevents the deposit of moisture and ice upon the door plate and provides at the same time an intensive supply of the interior of the car with fresh air.

We claim:

1. In an airing device for a motor vehicle having a body and a rear flap-like door closing said body and having a rectangular outer part and a rectangular inner part located substantially under said outer part, a door plate enclosed by said parts, said inner part having beams forming frame walls extending to and connected with said outer part, at least some of said frame walls having air inlet slits, said beams including beams extending parallel to the direction of the vehicle, the last-mentioned beams having other frame walls spaced from the first-mentioned walls and having portions spaced from said outer part to form air outlet slots, said body further having door posts and door joints spaced from said other frame walls, said air outlet slots communicating with this space.

2. An airing device in accordance with claim 1, wherein said frame beams have inwardly extending flanges constituting edges of the first-mentioned slits.

3. An airing device in accordance with claim 1, wherein said inner part has downwardly extending supporting flanges having the second-mentioned slits.

4. An airing device in accordance with claim 1, wherein the first-mentioned slits are inlet slits shifted in position relatively to the second-mentioned slits which are the outlet slits.

5. An airing device in accordance with claim 1, wherein said outer part has a flange extending over said inner part and wherein said door post has a step-like portion extending opposite and parallel to the last-mentioned flange.

6. An airing device in accordance with claim 1, having means forming a water outflow channel, said space extending into said channel.

7. An airing device in accordance with claim 6, wherein said channel includes a higher wall facing the interior of the body, and a door packing carried by said wall.

* * * * *